United States Patent
Ross et al.

(10) Patent No.: US 8,105,068 B2
(45) Date of Patent: Jan. 31, 2012

(54) REUSABLE INFUSION BAG

(75) Inventors: William Tod Ross, Cheney, KS (US); Jeffery Max Buxman, Valley Center, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 274 days.

(21) Appl. No.: 12/264,998

(22) Filed: Nov. 5, 2008

(65) Prior Publication Data

US 2010/0112117 A1    May 6, 2010

(51) Int. Cl.
B29C 70/44    (2006.01)
B29C 70/48    (2006.01)

(52) U.S. Cl. .................. 425/388; 425/387.1; 425/389; 425/503; 425/504

(58) Field of Classification Search .................. 425/111, 425/112, 387.1, 388, 389, 503, 504
See application file for complete search history.

(56) References Cited

U.S. PATENT DOCUMENTS

| | | | | |
|---|---|---|---|---|
| 2,913,036 A * | 11/1959 | Smith | ............................ | 264/102 |
| 4,132,755 A * | 1/1979 | Johnson | ........................ | 264/553 |
| 4,622,091 A * | 11/1986 | Letterman | ..................... | 156/286 |
| 4,715,805 A * | 12/1987 | Nasu | ............................... | 425/504 |
| 4,816,106 A * | 3/1989 | Turris et al. | ..................... | 156/285 |
| 4,902,215 A * | 2/1990 | Seemann, III | ................. | 425/406 |
| 4,975,311 A * | 12/1990 | Lindgren | ........................ | 428/156 |
| 5,052,906 A * | 10/1991 | Seemann | ........................ | 425/112 |
| 5,129,813 A * | 7/1992 | Shepherd | ........................ | 425/504 |
| 5,242,652 A * | 9/1993 | Savigny | ........................... | 264/510 |
| 5,403,537 A * | 4/1995 | Seal et al. | ..................... | 264/511 |
| 5,433,165 A * | 7/1995 | McGuiness et al. | .......... | 114/357 |
| 5,439,635 A * | 8/1995 | Seemann | ....................... | 264/510 |
| 5,464,337 A * | 11/1995 | Bernardon et al. | ........... | 425/112 |
| 5,576,030 A * | 11/1996 | Hooper | .......................... | 425/112 |
| 5,601,852 A * | 2/1997 | Seemann | ....................... | 425/112 |
| 5,665,301 A * | 9/1997 | Alanko | .......................... | 264/571 |
| 5,702,663 A * | 12/1997 | Seemann | ...................... | 264/510 |
| 5,939,013 A * | 8/1999 | Han et al. | ...................... | 264/510 |
| 6,149,844 A * | 11/2000 | Graham | .......................... | 264/71 |
| 6,203,749 B1 * | 3/2001 | Loving | ........................... | 264/510 |
| 6,508,974 B1 * | 1/2003 | Loving | ........................... | 264/510 |
| 6,586,054 B2 * | 7/2003 | Walsh | ......................... | 427/430.1 |
| 6,627,142 B2 * | 9/2003 | Slaughter et al. | ............. | 264/510 |
| 6,656,411 B1 * | 12/2003 | McClure et al. | ............... | 264/510 |
| 6,919,039 B2 * | 7/2005 | Lang et al. | ..................... | 264/510 |
| 6,964,561 B2 * | 11/2005 | Louderback et al. | ....... | 425/129.1 |
| 6,991,449 B1 * | 1/2006 | Mead et al. | .................... | 425/389 |
| 7,189,345 B2 * | 3/2007 | Sewell et al. | .................. | 264/101 |
| 7,306,450 B2 * | 12/2007 | Hanson | .......................... | 425/383 |
| 7,338,628 B2 * | 3/2008 | Sisk | ............................... | 264/511 |

(Continued)

*Primary Examiner* — Joseph Del Sole
*Assistant Examiner* — Seyed Masoud Malekzadeh
(74) *Attorney, Agent, or Firm* — Hovey Williams LLP

(57) ABSTRACT

A reusable apparatus and method for forming a composite part through vacuum assisted resin transfer molding (VARTM). The reusable apparatus may be configured to vacuum seal a curable material, such as composite material, against a tool and disperse a permeating substance such as liquid resin through the curable material. The reusable apparatus may comprise a sheet of material such as rubber having a plurality of surface deviations facing the curable material and the tool. The surface deviations may provide paths for evenly distributed air flow as air is evacuated from between the sheet of material and the tool. Additionally, the surface deviations may allow the permeating substance to be evenly dispersed throughout the curable material. A vacuum outlet of the tool may be positioned between two sealing apparatuses to provide continuous vacuum suction proximate a perimeter of the sheet of material to prevent air from leaking in.

14 Claims, 3 Drawing Sheets

U.S. PATENT DOCUMENTS

| | | | |
|---|---|---|---|
| 7,413,694 B2 * | 8/2008 | Waldrop et al. | 264/257 |
| 7,497,981 B2 * | 3/2009 | Graham | 264/266 |
| 7,544,055 B2 * | 6/2009 | Crane et al. | 425/564 |
| 2002/0017745 A1 * | 2/2002 | Vorenkamp et al. | 264/492 |
| 2003/0011094 A1 * | 1/2003 | Filsinger et al. | 264/102 |
| 2004/0017020 A1 * | 1/2004 | Loving | 264/134 |
| 2004/0113315 A1 * | 6/2004 | Graham | 264/266 |
| 2008/0203622 A1 * | 8/2008 | Graham | 264/510 |
| 2009/0278319 A1 * | 11/2009 | Hanson et al. | 277/312 |

* cited by examiner

REUSABLE INFUSION BAG

BACKGROUND

1. Field

The present invention relates to aircraft components. More particularly, the present invention relates to vacuum assisted resin transfer molding with a reusable vacuum bag.

2. Related Art

Vacuum assisted resin transfer molding (VARTM) is a composite manufacturing process in which dry fibers of composite material are laid on a tool beneath a nylon vacuum bag and vacuum sealed while liquid resin is drawn through the composite material with a vacuum pump. Traditionally, a flow media or resin distribution media made of a nylon, plastic, or metal and having a high permeability is placed over the composite material to allow resin to flow over it and subsequently be evenly dispersed throughout the composite material. Additionally, a breather cloth made of fiberglass or peel-ply may be placed beneath the nylon vacuum bag to help pull resin through the material and allow air to be evacuated from between the nylon vacuum bag and the tool. The nylon vacuum bag may then be placed over the composite material, flow media, and breather cloth, and sealed to the tool with chromate vacuum bag tape. A vacuum inlet and a vacuum outlet may allow the liquid resin to be pulled through the composite material. Once the liquid resin is distributed throughout the composite material and the vacuum bag is compressed against the composite material by vacuum force, the vacuum pump may be removed, and the part may then be cured by heat to harden the composite part.

Some disadvantages to the VARTM method include the need to individually cut the flow media, breather cloth, and vacuum bag for placement over the composite material, particularly when manufacturing complex-shaped composite parts. This may be time consuming and error-prone. Additionally, with complex-shaped composite parts, the flow media may need to be heat-set or spliced into many pieces to allow the flow media to conform to the desired shape for resin distribution. And, because the flow media, breather cloth, and vacuum bag are separate parts laid together, they may unintentionally move or shift during the vacuum and curing process.

Another disadvantage to the traditional VARTM method is that the vacuum bag, flow media, and breather cloth are not reusable. As the liquid resin is dispersed throughout the composite part, it also permeates the vacuum bag, flow media, and breather cloth, so that during the curing process, these items are also hardened as a result. Therefore, even when manufacturing identical parts, a new vacuum bag, flow media, and breather cloth must be used in the production of each individual part.

Finally, in the traditional VARTM process, once the vacuum pump is removed, the vacuum bag tape often leaks or bleeds off vacuum, and the vacuum bag therefore loses vacuum integrity when the vacuum source is turned off or disconnected. This, in turn, may negatively impact the structural integrity of the resulting part.

Therefore an improved apparatus and method for forming composite parts through vacuum assisted resin transfer molding is desired.

SUMMARY

The present invention provides a reusable apparatus and method for forming a composite part through vacuum assisted resin transfer molding (VARTM). The reusable apparatus may be used to vacuum seal a curable material, such as composite material, against a tool and disperse a permeating substance, such as liquid resin, throughout the curable material.

The reusable apparatus may comprise a sheet of material made of rubber or a rubber-like substance and at least one sealing apparatus for sealing the sheet of material to the tool. The sheet of material may comprise a peripheral edge, a first side facing away from the curable material, and a second side facing the curable material and having a plurality of surface deviations. The surface deviations may comprise a first flow path area, a trough located to one side of the first flow path, a dam partially surrounding the first flow path area and the trough, and a second flow path area proximate the peripheral edge of the sheet of material.

The first flow path area may provide a plurality of flow paths for evenly disbursing the permeating substance throughout the curable material as the permeating substance flows from the trough to an opening of the dam at an opposite side of the first flow path area from the trough. The sheet of material may be placed over the curable material and the tool so that a permeating substance inlet of the tool is positioned proximate the trough, and the first flow path area is positioned between the permeating substance inlet and a permeating substance outlet of the tool. A vacuum pump may be attached to the permeating substance outlet to suction the permeating substance in through the permeating substance inlet and back out through the permeating substance outlet.

The sealing apparatus may comprise a first sealing apparatus and a second sealing apparatus, with the first sealing apparatus outward of the second flow path area and the second sealing apparatus inward of the second flow path area. Air may be evacuated through a sealing outlet of the tool from between the first and the second sealing apparatuses, thereby compressing the second flow path area toward the tool. The second flow path area may remain under continuous vacuum suction, provided through the sealing outlet, throughout the VARTM process and curing of the curable material.

A method for forming a composite part with the reusable apparatus may comprise the steps of placing the curable material on the tool and then placing the sheet of material over the curable material with the second side of the sheet of material facing the curable material. Next, the second side of the sheet of material proximate the peripheral edge may be sealed to the tool and the second flow path area may remain under continuous vacuum suction to maintain an airtight seal. Air may also be evacuated from between the sheet of material and the tool through the permeating substance outlet by vacuum suction. This vacuum suction may subsequently pull the permeating substance through the permeating substance inlet, into the trough. Then, from the trough, the permeating substance may flow through the first flow path area, allowing some of the permeating substance to permeate the curable material. Any excess permeating substance may then be pulled out through the permeating substance outlet. Finally, the permeating substance outlet and the permeating substance inlet may be closed off and the curable material may be cured under heat as the sealing outlet continues to provide vacuum suction, airtight sealing between the sheet of material and the tool around the curable material.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
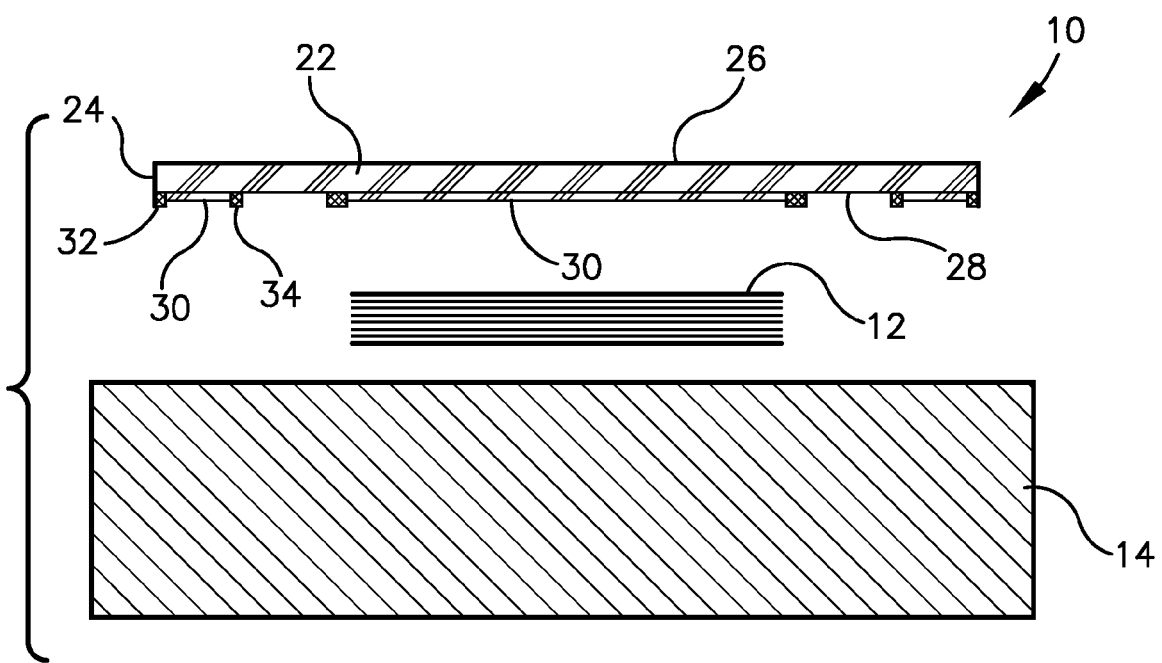
FIG. 1 is an exploded, cross-sectional, side elevation view of a reusable apparatus placed over a curable material and a tool in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
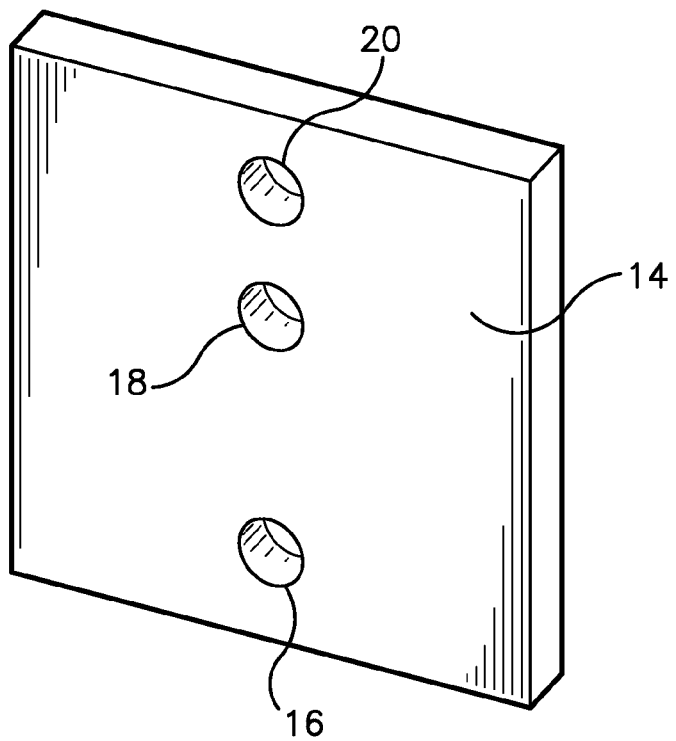
FIG. 2 is a perspective view of the tool of FIG. 1.

As illustrated in FIGS. 1-4, embodiments of the present invention provide a reusable apparatus 10 and method 200 for forming a composite part through vacuum assisted resin transfer molding (VARTM). The reusable apparatus 10 may be configured to vacuum seal a curable material 12 against a tool 14 and disperse a permeating substance (not shown) through the curable material 12. The curable material 12 may be any type of permeable material that may be hardened through curing, such as composite material or dry fibers of a composite material. The permeating substance may include liquid resin or other flowable substances. The tool 14 may have a plurality of inlets 16 and outlets 18,20, as illustrated in FIG. 2, for transferring air and/or the permeating substance into and out of an area between the reusable apparatus 10 and the tool 14. Specifically, the tool 14 may comprise a permeating substance inlet 16, a permeating substance outlet 18, and a sealing outlet 20, as described herein.

The reusable apparatus 10 may comprise a sheet of material 22 having a peripheral edge 24, a first side 26 facing away from the curable material 12, and a second side 28 adjacent to and facing the curable material 12. The second side may comprise a plurality of surface deviations 30, described in more detail below. The second side 28 of the sheet of material 22 proximate the peripheral edge 24 may be sealed to the tool 14 by at least one sealing apparatus 32,34.

The sheet of material 22 may be formed of a flexible material that is substantially resistant to bonding with various types of resin, even when subjected to high amounts of pressure and/or heat, such as during a composite curing process. In one embodiment, the sheet of material 22 may be formed of any flexible and durable rubber or rubber-like material, such as silicone. The rubber and/or rubber-like material may be moldable in sheet and/or spray form.

Figure 3:
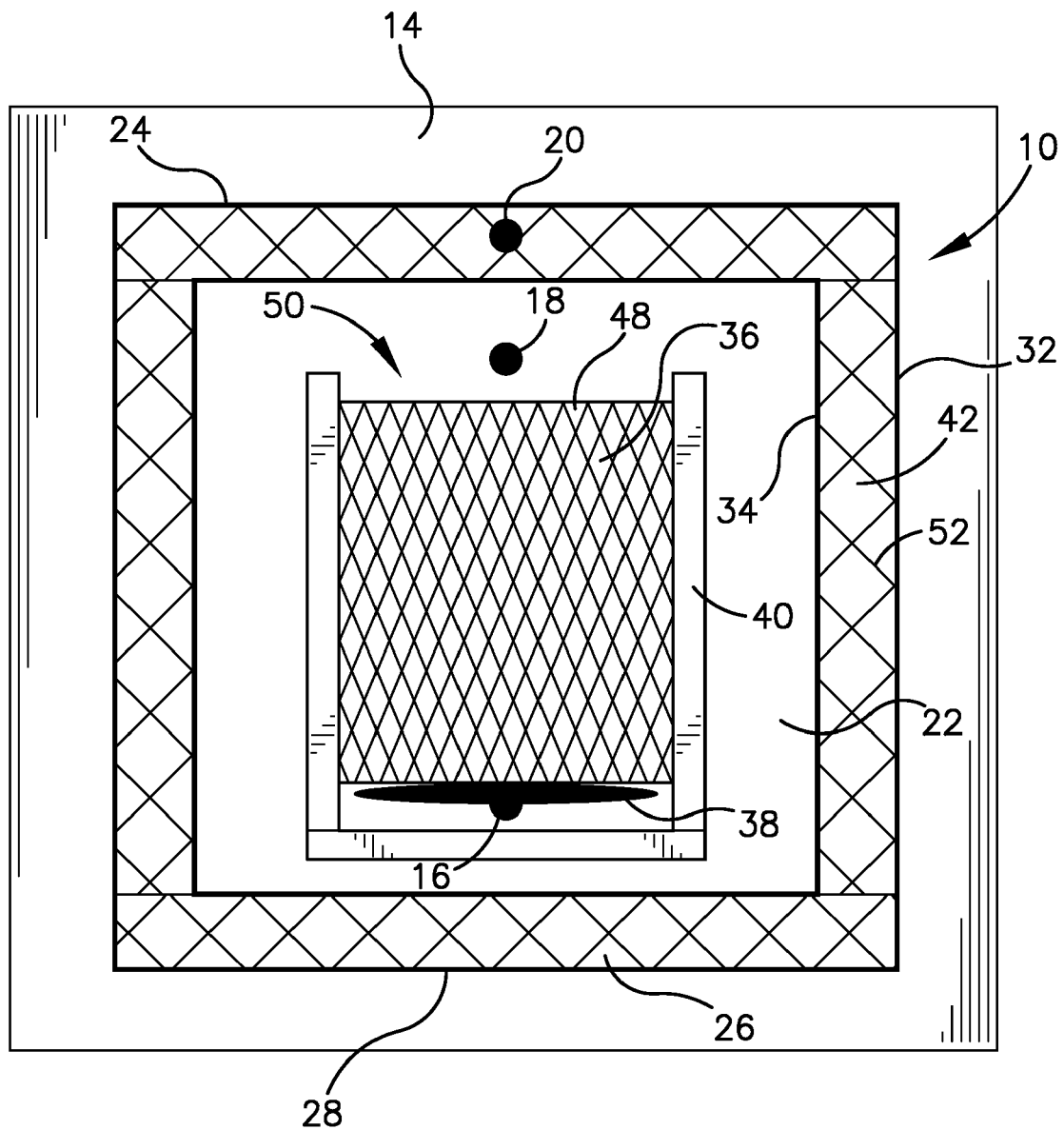
FIG. 3 is a top plan view of the reusable apparatus and the tool of FIG. 1.

The sheet of material 22 may be cut or otherwise formed to conform to any desired shape such as the shape of an aircraft component or a composite part. For example, the sheet of material 22 may be formed with four sides so as to be placed over a curable material having four sides and resting against a substantially flat surface of the tool 14, as illustrated in FIG. 3. Or, for example, the sheet of material may be wrapped around curable material on a mandrel (not shown).

Note that FIG. 3 illustrates a schematic top view of the reusable apparatus 10 placed over the tool 14 in order to illustrate where the permeating substance inlet 16, the permeating substance outlet 18, and the sealing outlet 20 of the tool 14 may be positioned in reference to reusable apparatus 10. FIG. 3 illustrates the sheet of material 22 as being substantially transparent such that the plurality of surface deviations 30 on the second side 28 of the sheet of material 22 may be viewed from the first side 26. However, the sheet of material 22 may be transparent, opaque, or any combination thereof without departing from the scope of the invention.

The surface deviations 30 assist in the flow of air and/or the permeating substance between the sheet of material 22 and the tool 14. The surface deviations 30 may be formed by embossing various shapes into the sheet of material 22. Alternatively, the sheet of material 22 may be formed in a mold (not shown) to comprise various surface deviations. The surface deviations 30 may comprise a first flow path area 36, a trough 38, a dam 40, and a second flow path area 42, as illustrated in FIG. 3.

The first flow path area 36 may be configured for directing a flow of the permeating substance evenly throughout the curable material 12 and may comprise a plurality of flow path protrusions 48. For example, the flow path protrusions 48 may include an embossed or molded crisscross pattern, as illustrated in FIG. 3, or a plurality of staggered circular columns protruding from the second side of the sheet of material 22. The flow path protrusions 48 may comprise any surface deviations arranged in any pattern sufficient to provide a plurality of flow paths substantially evenly dispersed over the curable material 12. The first flow path area 36 may be of any shape and dimensions, but preferably matches the shape and the area dimensions of the curable material 12.

The trough 38 may be an elongated groove embossed or molded into the second side 28 of the sheet of material 22 into which the permeating substance may be dispersed before passing through the first flow path area 36. Alternatively, the trough 38 may be an elongated highly permeable area into which the permeating substance may be dispersed. The trough 38 may be located to one side of the first flow path area 36 and may extend along a width of the first flow path area 36 and/or the curable material 12 for creating an evenly distributed flow across the width of the curable material 12.

The dam 40 may be a wall-like protrusion extending out of the second side 28 of the sheet of material 22. The dam 40 at least partially surrounds the trough 38 and the first flow path area 36. The dam 40 may be molded or embossed into the sheet of material 22 and may blockade the permeating material from flowing in an undesired direction. The dam 40 may include a number of walls or one substantially continuous wall that surrounds the trough 38 on a side of the trough 38 opposite of the first flow path area 36 and a portion of the first flow path area 36. However, in various embodiments of the invention, the dam 40 may not form a completely continuous boundary around the first flow path area 36, but rather may have an opening 50 proximate a side of the first flow path area 36 opposite the trough 38 such that the permeating substance may exit the first flow path area 36 through the opening 50.

The second flow path area 42 may be positioned outside of the dam 40 and proximate the peripheral edge 24 of the sheet of material 22. The second flow path area 42 may comprise a plurality of vacuum path protrusions 52. For example, the vacuum path protrusions 52 may include an embossed or molded crisscross pattern or a plurality of staggered circular columns protruding from the second side 28 of the sheet of material 22 proximate the peripheral edge 24 of the sheet of material 22. The vacuum path protrusions 52 may comprise any surface deviations arranged in any pattern sufficient to provide a plurality of flow paths substantially evenly dispersed throughout the entire second flow path area 42 for use in sealing the sheet of material 12 to the tool 14.

The sealing apparatus 32,34 may be any device or material for creating an airtight seal between the sheet of material 22 and the tool 14. For example, the sealing apparatus 32,34 may be sealing tape. Alternatively, the sealing apparatus 32,34 may be a rubber or silicone sealing device as disclosed in co-pending U.S. application Ser. No. 12/264,973, herein incorporated by reference in its entirety. One embodiment disclosed in U.S. application Ser. No. 12/264,973 is a rubber or silicone sealing device having a substantially crescent-shaped cross-section for creating a suction-cup-like seal with the tool 14 when forced downward towards the tool 14.

The sealing apparatus 32,34 may be attached to or integral with the second side 28 of the sheet of material 22. An exemplary embodiment of the sealing apparatuses 32,34 is proximate to the peripheral edge 24 and forms a complete boundary around the first flow path area 36, the trough 38, and the dam 40. In various embodiments of the invention, the sealing apparatus 32,34 may comprise a first sealing apparatus 32 and a second sealing apparatus 34, with the first sealing apparatus 32 located outward of and substantially adjacent to the second flow path area 42, and the second sealing apparatus 34 located inward of and substantially adjacent to the second flow path area 42.

Figure 4:
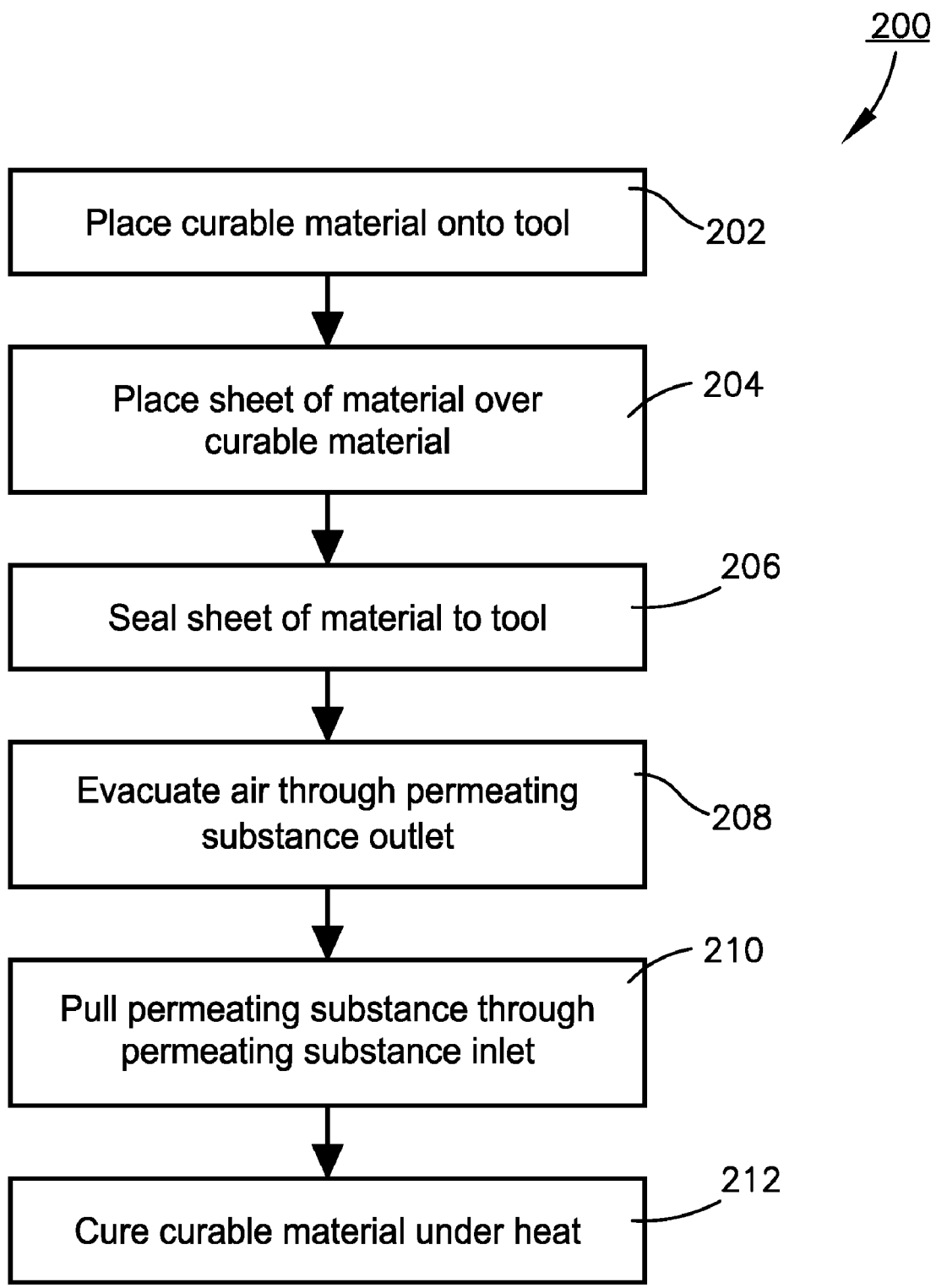
FIG. 4 is a flow chart illustrating method steps for using the reusable apparatus of FIG. 1.

A method 200 for using the reusable apparatus 10, such as in the forming of a composite part, is shown in FIG. 4. Note that steps of the method 200 may be performed in various orders and/or with steps added or omitted without departing from the scope of the invention. The method 200 may first comprise placing the curable material 12 onto the tool 14, as depicted in step 202. Next, the sheet of material 22 may be placed over the curable material 12, as depicted in step 204. The sheet of material 22 may have an area greater than the curable material 12, such that the second side 28 of the sheet of material 22 proximate the peripheral edge 24 may be sealed to the tool 14.

As illustrated in FIG. 3, the sheet of material 22 may be placed on the tool 14 such that the trough 38 may be positioned proximate the permeating substance inlet 16 of the tool 14. In this position, the permeating substance may flow through the permeating substance inlet 16 into the trough 38, subsequently spread throughout the trough 38, and then flow out from the trough 38 evenly throughout a width of the first flow path area 36. The second periphery edge 46 of the first flow path area 36 and/or the opening 50 of the dam 40 may be positioned proximate the permeating substance outlet 18 of the tool 14. A vacuum pump (not shown) may be connected via the permeating substance outlet 18 to suction air and/or at least a portion of the permeating substance out from between the sheet of material 22 and the tool 14. So, the permeating substance may be pulled in through the permeating substance inlet 16, into the trough 38, through the first flow path area 36, and then out through permeating substance outlet 18 by the vacuum pump.

The first and second sealing apparatuses 32,34 may be positioned such that the sealing outlet 20 of the tool 14 may be located between the first and second sealing apparatuses 32,34 to maintain vacuum suction of the sheet of material 22 against the tool 14. Because of the configuration of the flow paths between the vacuum path protrusions 52, the second flow path area 42 may be uniformly compressed against the tool 14 between the first and second sealing apparatuses 32,34 when air is evacuated through the sealing outlet 20.

Once the sheet of material 22 is properly aligned with the tool 14, the method 200 may comprise sealing the second side 28 of the sheet of material 22 proximate the peripheral edge 24 of the sheet of material 22 to the tool 14 using the sealing apparatus 32,34, as depicted in step 206. For example, the first and second sealing apparatuses 32,34 attached to or integral to the sheet of material 22 may be placed against the tool 14 with the sealing outlet 20 of the tool 14 located between the first and second sealing apparatuses 32,34. Then a vacuum force may be applied to suction air out through the sealing outlet 20, thereby compressing the first and second sealing apparatuses 32,34 and the second flow path area 42 substantially against the tool 14. When the first and second sealing apparatuses 32,34 are compressed against the tool 14, they may form an airtight seal around the curable material 12 between the sheet of material 22 and the tool 14.

Additionally, as depicted in step 208, the method 200 may also comprise evacuating air from between the sheet of material 22 and the tool 14 through the permeating substance outlet 18. As discussed above, this may be achieved by attaching a vacuum pump to the permeating substance outlet 18. As air is pumped out or otherwise evacuated from between the sheet of material 22 and the tool 14, the permeating substance may be simultaneously pulled through the at least one vacuum pump inlet 16 and through the first flow path area 36 and the curable material 12. Then at least a portion of the permeating substance may flow out through the permeating substance outlet 18, as depicted in step 210. However, as the permeating substance flows through the curable material 12, at least a portion of the permeating substance may permeate the curable material 12 and will therefore not flow out through the permeating substance outlet 18.

Once the permeating substance has been pulled through the first flow path area 36, the permeating substance inlet 16 and permeating substance outlet 18 may each be covered, sealed, or substantially closed off such that neither air nor the permeating substance may pass through the permeating substance outlet 18 and the permeating substance inlet 16. However, the sealing outlet 20 may continue to be connected to a vacuum pump or any other apparatus for applying vacuum suction to the second flow path area 42 of the sheet of material 22. Then, as depicted in step 212, the curable material 12 may be cured under heat. By applying vacuum suction via the sealing outlet 20 throughout curing of the curable material 12, air may be prevented from leaking in between the sheet of material 22 and the tool 14.

Once the curable material 12 has been cured, the sheet of material 22 may be removed. The sheet of material 22, particularly when made of rubber or silicone, may be reused, because unlike prior art vacuum bags, the sheet of material 22 may be self-releasing such that the permeating substance will not bond to the sheet of material 22. Therefore the curable material 12 may be hardened while the sheet of material 22 remains flexible, allowing it to be reused. Additionally, if either of the first and second sealing apparatuses 32,34 are composed of the same material as the sheet of material 22, such as rubber or silicone, then they may also be reused.

Although the invention has been described with reference to the embodiments illustrated in the attached drawings, it is noted that equivalents may be employed and substitutions made herein without departing from the scope of the invention as recited in the claims. For example, the reusable apparatus 10 may comprise one or both of the sealing apparatuses 32,34 and the sheet of material 22, or the reusable apparatus 10 may comprise the sheet of material 22 only, and other non-reusable sealing apparatuses may alternatively be used to seal the sheet of material 22 to the tool 14.

Having thus described an embodiment of the invention, what is claimed as new and desired to be protected by Letters Patent includes the following:

1. A reusable apparatus for vacuum sealing a curable material against a tool, wherein the tool has a permeating substance inlet and a permeating substance outlet, and dispersing a permeating substance through the curable material, the reusable apparatus comprising:
    a first side configured to face away from the curable material;
    a second side configured to face the curable material;
    a peripheral edge extending between the first and second sides; and
    a plurality of surface deviations formed on the second side and configured for directing a flow of the permeating substance evenly throughout the curable material, wherein the surface deviations comprise a first flow path area having a plurality of flow path protrusions configured to provide a plurality of flow paths therebetween for directing a flow of the permeating substance evenly throughout the curable material and an elongated groove substantially extending a width of the curable material and located to one side of the first flow path area, wherein the elongated groove is configured to be positioned proximate to the permeating substance inlet of the tool and configured to evenly disperse the permeating substance throughout the elongated groove and throughout a width of the first flow path area.

2. The reusable apparatus of claim 1, wherein the reusable apparatus is formed from a sheet of rubber or rubber-like material on which the surface deviations are formed.

3. The reusable apparatus of claim 2, wherein the sheet of material is at least one of rubber and silicone.

4. The reusable apparatus of claim 1, wherein the surface deviations further comprise a dam protruding outward from the second side of the sheet of rubber material and partially surrounding the first flow path area and the elongated groove.

5. The reusable apparatus of claim 1, wherein the surface deviations further comprise a second flow path area having a plurality of vacuum path protrusions configured for evenly compressing and sealing the second side of the sheet of material proximate the peripheral edge against the tool.

6. The reusable apparatus of claim 5, further comprising:
    a first sealing apparatus outward of the second flow path area adjacent the peripheral edge; and
    a second sealing apparatus inward of the second flow path area,
    wherein the first and second sealing apparatuses are configured to seal the second side of the reusable apparatus to the tool, forming a complete boundary around the curable material.

7. The reusable apparatus of claim 6, wherein at least one of the first and second sealing apparatuses have a substantially crescent-shaped cross-section for creating a suction-cup-like seal with the tool when forced downward towards the tool.

8. The reusable apparatus of claim 1, wherein the first flow path is positioned between a permeating substance inlet and a permeating substance outlet of the tool, and the elongated trough is positioned proximate the permeating substance inlet of the tool.

9. The reusable apparatus of claim 6, wherein the first and second sealing apparatuses are configured to be positioned on either side of a sealing outlet of the tool and the sealing outlet is attached to a vacuum pump to maintain a vacuum suction of the first and second sealing apparatuses against the tool.

10. A sheet of rubber thin enough and flexible enough to substantially conform to a desired shape for vacuum sealing a curable material against a tool and dispersing a permeating substance through the curable material, wherein the tool has a permeating substance inlet and a permeating substance outlet, the sheet of rubber comprising:
    a first side facing away from the curable material;
    a second side adjacent to and facing the curable material;
    a peripheral edge extending between the first and second sides;
    a first flow path area integral with the second side comprising flow path deviations configured to provide a plurality of flow paths for evenly distributing the permeating substance throughout the curable material;
    an elongated groove formed into the second side, substantially extending a width of the curable material, and located proximate the first flow path area, wherein the elongated groove is configured to be positioned proximate to the permeating substance inlet of the tool and configured to evenly disperse the permeating substance throughout the elongated groove and throughout a width of the first flow path area;
    a dam integral to and protruding outward from the second side and partially surrounding the first flow path area and the elongated trough; and
    a second flow path area comprising surface deviations configured to provide a plurality of flow paths for evenly suctioning the second side proximate the peripheral edge of the sheet of rubber material against the tool; and
    a sealing apparatus for forming an air-tight seal between the second side and the tool, wherein the sealing apparatus comprises a continuous first sealing apparatus outward of the second flow path area, and a continuous second sealing apparatus inward of the second flow path area.

11. The reusable apparatus of claim 10, wherein the sheet of rubber is configured such that when the elongated groove is positioned proximate the permeating substance inlet of the tool, the first flow path is positioned between the permeating substance inlet and the permeating substance outlet of the tool, and the first and second sealing apparatuses are positioned such that a sealing outlet of the tool is located therebetween to maintain vacuum suction of the sheet of rubber against the tool.

12. The reusable apparatus of claim 10, wherein the sheet of rubber material is comprised of silicone.

13. The reusable apparatus of claim 10, wherein the dam has an opening proximate a side of the first flow path area opposite the elongated groove such that the permeating substance can exit the first flow path area through the opening.

14. The reusable apparatus of claim 10, wherein the first and second sealing apparatuses are comprised of rubber, integral with the sheet of rubber material, and each have a substantially crescent-shaped cross-section for creating a suction-cup-like seal with the tool when forced downward towards the tool.

* * * * *